_United States Patent_ [19]

Mitchell

[11] Patent Number: 5,754,295

[45] Date of Patent: May 19, 1998

[54] NON-CONTACTING TORQUE SENSOR AND DISPLACEMENT MEASURING APPARATUS AND METHOD

[75] Inventor: Donald K. Mitchell, Newton, Mass.

[73] Assignee: MicroE, Inc., Natick, Mass.

[21] Appl. No.: 771,033

[22] Filed: Dec. 20, 1996

[51] Int. Cl.$^6$ ................................................. G01B 9/02
[52] U.S. Cl. ..................... 356/356; 356/345; 250/237 G
[58] Field of Search .......................... 356/345, 356, 356/358; 250/237 G

[56] References Cited

U.S. PATENT DOCUMENTS

| | | | |
|---|---|---|---|
| 5,327,218 | 7/1994 | Igaki | 356/356 |
| 5,386,291 | 1/1995 | Sato | 250/237 G |
| 5,430,546 | 7/1995 | Huber | 356/356 |
| 5,450,199 | 9/1995 | Rieder | 356/356 |
| 5,486,923 | 1/1996 | Mitchell et al. | 356/345 |
| 5,559,599 | 9/1996 | Michael | 356/356 |
| 5,559,600 | 9/1996 | Mitchell | 356/356 |

OTHER PUBLICATIONS

"Rotating Torque Sensor", Nov. 1995, Sensor Developments, Inc., Lake Orion, MI.

"Rotating Torque Sensor Evolution", prior to Jun. 10, 1996, Sensor Developments, Inc., Lake Orion, MI.

"Now Measure Torque and Angle or R.P.M. Simultaneously", Jun. 10, 1996, Sensor Developments, Inc, Lake Orion, MI.

R. Beyerle, "Slotted Disc Senses Angular Acceleration", Nov. 23, 1995, Machine Design, p. 54.

Advertisement, Sensor Developments, Inc., May, 1996, NASA Tech Briefs, p. 96.

*Primary Examiner*—Frank G. Font
*Assistant Examiner*—Robert Kim
*Attorney, Agent, or Firm*—Limbach & Limbach L.L.P.

[57] ABSTRACT

A displacement measuring apparatus is disclosed, one embodiment of which employs two diffractive code disks, attached to a shaft, and a sensing head which need not contact the shaft. The head includes a light source with beam shaping optics, which creates two individual beamlets and pre-cranks the beamlets so that they reach the first grating at proscribed angles. Two diffracted orders from the first grating are allowed, preferably through free space propagation, to strike the second grating and to be rediffracted by the second grating. A phased-array detector, or equivalent array of detecting elements, are positioned beyond the second grating and in a region of natural interference between rediffracted orders of the incident diffracted orders, to detect the interference fringes which are generated there. The change in phase of the fringes is proportional to the relative displacement between the first and second gratings.

24 Claims, 3 Drawing Sheets

Side View

Top View

Side View

Top View

NON-CONTACTING TORQUE SENSOR AND DISPLACEMENT MEASURING APPARATUS AND METHOD

TECHNICAL FIELD

The present invention is directed generally to sensing relative displacement, and more particularly to sensing relative displacement of diffraction gratings to measure the torque applied to a rotating shaft.

BACKGROUND ART

While measurement of torque being applied to a shaft has been achieved in the past through a variety of techniques, it is believed that such techniques have not involved the use of diffractive technology. In such conventional approaches, the measurement is sometimes dependent upon the absolute rotation of the shaft in question. Thus, high speed shaft rotation can affect the accuracy of such conventional techniques. Moreover, conventional approaches have sometimes used sensing shafts, inserted into the torque transmitting shaft, thus requiring joints which can weaken the torque transmitting shaft. Further, precise alignment of the torque sensing apparatus to the shaft being measured is often required for reliable measurements.

Examples of present torque sensors include torque sensors which employ a pair of optical encoder disks, one with radial slits, the other with angled slits such as those described in the article R. Beyerle, "Slotted disc senses angular acceleration," Machine Design, Nov. 23, 1995, p. 54; and the "foil strain gauge" based torque sensor products of Sensor Developments Inc. of Lake Orion, Mich., discussed in the article "Rotating Torque Sensor Evolution," available on the company's world-wide-web site at http://www.sendev.com.

SUMMARY OF THE INVENTION

The above and other problems and disadvantages of prior torque sensing apparatus and methods are overcome by the present invention in which the relative angular displacement of two diffractive code disks (gratings), spaced axially along a torque transmitting shaft, is measured. If the torsional stiffness of the shaft is known, then the relative displacement is a direct measure of the applied torque.

More generally, the present invention is directed to an angular displacement sensing apparatus for use with an elongated member which is rotatable along a longitudinal axis. The apparatus comprises a source of monochromatic, partially coherent light of wavelength λ which provides a pair of beams at a predetermined angle between them. A first diffraction producing device is affixed to the elongated member for rotation therewith about a first point along the elongated member. A second diffraction producing device, substantially identical to the first diffraction producing device, is affixed to the elongated member for rotation therewith about a second point along the elongated member which is spaced away from the first point. The source of partially coherent light and the first and second diffraction producing devices are positioned so that the first diffraction producing device diffracts the pair of beams, and the second diffracting producing device rediffracts the diffracted pair of beams. A detector is positioned in a region of natural interference between the rediffracted beams, whereby a change in relative position between the first and second diffraction producing devices appears as a change in a fringe pattern in the region of natural interference.

In the preferred embodiment of the present invention, the angular displacement is measured by illuminating the first grating with a pair of wave-front corrected, collimated laser beams, in accordance with techniques disclosed in U.S. Pat. No. 5,486,923, assigned to the same assignee as the subject application. The two beams, which form a fringe pattern that in U.S. Pat. No. 5,486,923 is normally sensed with a phased-array detector in an encoder application, are instead relayed optically to the second, axially displaced, grating. When the beams are relayed to the second grating, they are rediffracted. When properly configured, the interference of these rediffracted beams form a fringe pattern whose phase is proportional to the differential rotational angle of the two gratings. A similar configuration can be used to measure the relative linear displacement of two linear gratings, allowing measurement of displacement to be independent force sensor.

In accordance with the present invention, it has been discovered that diffractive technology can be used advantageously for torque sensing. Further, the configuration of the sensor of the present invention makes the measurement of torque totally independent of the absolute rotation of the shaft in question. Thus, the performance of the present invention is unaffected by high speed shaft rotation. Moreover, in the preferred embodiment, the gratings are attached directly to the user's shaft, so there are no weakening joints as would exist if a sensing shaft had to be inserted into the torque transmitting shaft. Also, to within very wide tolerances, the present invention does not have to be held in alignment to the shaft being measured.

These and other features of the present invention will be more readily understood upon consideration of the following detailed description and accompanying drawings.

DESCRIPTION OF THE INVENTION

Reference is made to U.S. Pat. No. 5,486,923, which is assigned to the same assignee as the subject application, which is incorporated by reference herein in its entirety.

Figure 1:
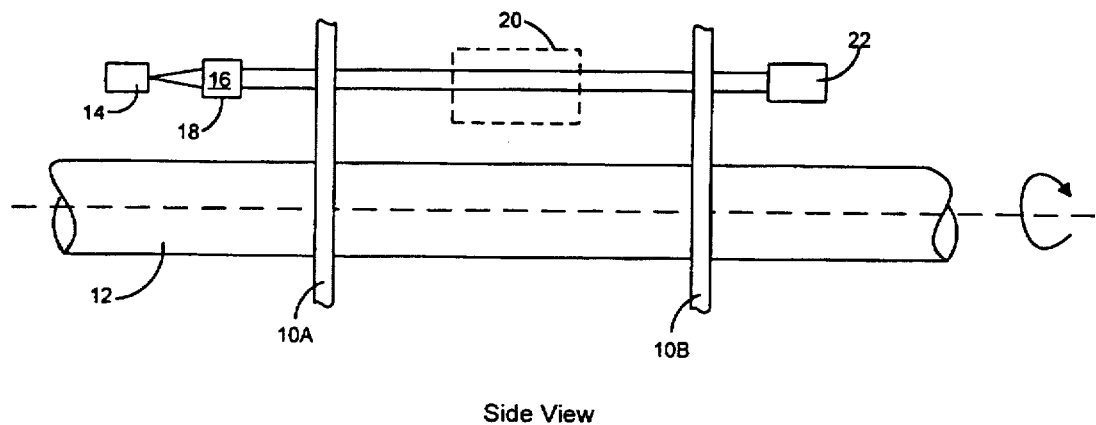
FIG. 1 is a simplified top view of a preferred embodiment of the present invention.

With reference to FIG. 1, a preferred embodiment of the present invention employs two diffractive code disks or gratings 10A, 10B, attached to a torque transmitting shaft 12, and a sensing head which does not need to have any contact with the shaft or the gratings. The head includes a light source 14 with beam shaping optics 16 which typically include a wave front compensator 18. The wave front compensator 18 creates two individual beamlets 24A, 24B, and "pre-cranks" the beamlets so that they reach the first grating at proscribed angles. The beamlets 24A, 24B are also "twisted," as described in greater detail in U.S. Pat. No. 5,486,923, to pre-compensate or pre-correct for the "twisting" that the radial grating patterns of the diffractive code disks 10A, 10B tend to impart to the diffraction being produced.

Further, the head may include a relay optic 20 which fits between the two identical gratings and which forms a non-inverted image of the first grating on the second grating. The relay function may be non-imaging insofar as it need only relay the two diffracted orders correctly. The preferred embodiment is to allow free space propagation.

Finally, the sensor head also includes a phased-array detector 22, or equivalent array of detecting elements, positioned beyond the second grating.

While the present invention has been described in terms of transmissive gratings, it is to be understood that a reflective embodiment would operate using the same physical principles.

Figure 2:
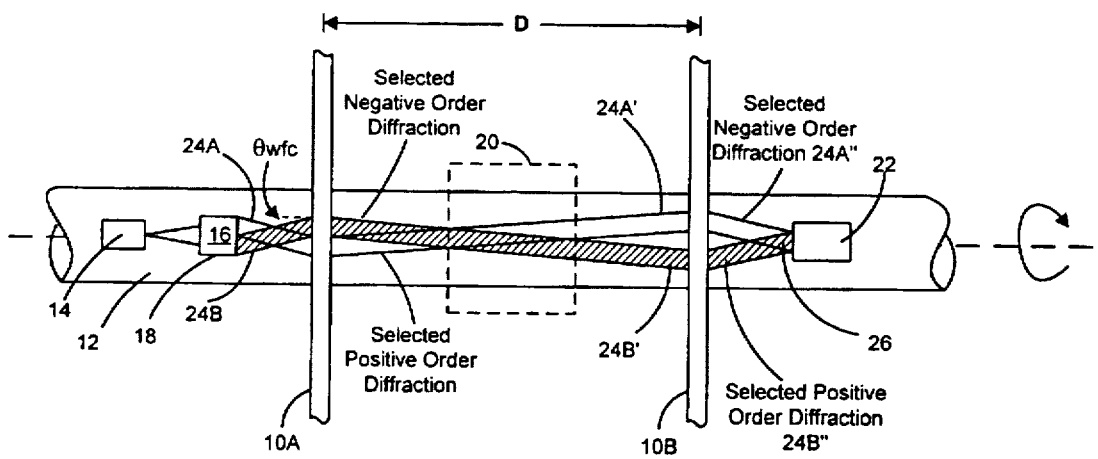
FIG. 2 is a simplified side view of a preferred embodiment of the present invention.

Referring now to FIG. 2, the operation of the present invention will be described in greater detail. In operation, the pre-crank angle, $\theta_{wfc}$, of the two pre-cranked beamlets 24A, 24B will have been selected so the frequency of their interference fringes will be compatible for sensing with phased array detector 22 where selected diffractive orders of the beamlets 24A, 24B, overlap in the natural interference region 26. As described in greater detail in the above reference U.S. Pat. No. 5,486,923, the region of "natural interference" is that region of interference before the plus and minus orders diverge from the diffracting element. In this region, the plus and minus orders interfere directly, without any intermediate reflection or magnification.

The two beamlets 24A, 24B, are projected to the first grating 10A where they are diffracted into many orders. Two orders 24A', 24B', from this plethora of diffracted orders, one from each beamlet 24A, 24B, are relayed onto the second grating 10B where the interaction between the orders and the second grating 10B creates two new beamlets of interest 24A", 24B", exiting the second grating 10B.

By properly selecting the input beamlet angles, $\theta_{wfc}$, we can arrange for the output beamlets 24A", 24B", to be the result of, for example, one positive first order diffraction and one negative first order diffraction each. (One beamlet is the (+1,−1) order and the other is the (−1,+1) order.) Because these beamlets have undergone symmetric diffractions at the two gratings 10A, 10B, they will propagate away from the second grating at exactly the pre-crank angle(s), and therefore create a set of interference fringes appropriate for the phased array detector 22. As described in detail in the above referenced U.S. Pat. No. 5,486,923, by appropriate selection of pre-correction angles at which beams are emitted from wave front correction element 18, the period of the interference fringes produced by the gratings can be adjusted to fit the period of the phased-array detector 22.

While it is clear that if the gratings 10A, 10B, are stationary these final interference fringes in region 26 will also be stationary, it has been discovered that when the gratings 10A, 10B, rotate synchronously these output fringes will also be stationary.

The apparent motion of diffraction fringes produced by a grating is due to the continuously increasing (for positive diffracted orders) or decreasing (for negative diffracted orders) phase shift imparted by a continuously moving grating. In the system of the present invention, however, where each beamlet has seen both a positive and a negative diffraction, the net phase shifts are zero. Thus, the fringe pattern on the detector 22 is stable, and independent of the motion of the gratings.

Torque Sensing

When a torque is applied to the shaft 12 connecting the two gratings 10A, 10B, there is an angular displacement of the second grating 10B relative to the first grating 10B (within the respective planes occupied by the gratings), and it is the effect this relative displacement has on the final fringes that is measured in accordance with the present invention. Whether the shaft 12 is rotating or stationary, the phase of the output fringe in region 26 only depends on the relative angular displacement of the two gratings 10A, 10B, since a relative displacement implies a diffracted order phase shift in one grating that is not compensated by a corresponding phase shift in the diffraction from the other grating. Thus, if there is no torque on the shaft 12 (even if there is constant rotation), then the fringe is at, say, 0 phase on the detector. On the other hand, if there is a torque, and the shaft 12 between the gratings 10A, 10B, twists, then the apparent phase of the moiré fringe on the detector 22 will differ from zero.

The sensitivity of the system is determined by the torsional stiffness of the shaft 12 and the period of the gratings 10A, 10B. If the first diffracted orders are selected, then, for each half cycle (of the grating) of relative motion between the gratings 360 degrees of phase change will be detected in the detected fringe. The amount of phase change detected by detector 22 will thus be proportional to the relative angular motion between gratings 10A, 10B. Since the period of the grating is known, the magnitude of the angular displacement can be determined. From the calculated angular displacement, and using the known stiffness of shaft 12, and the distance between the gratings 10A, 10B, the applied torque can then be determined.

Relay Optic 20

As described above, in the preferred embodiment of the present invention, the selected plus and minus order beamlets 24A', 24B', are allowed to propagate in free space to second grating 10B. However, depending upon the separation distance required between the gratings, which may be increased to improve sensitivity, and other factors such as the grating period(s), a relay optic 20 may be used which forms a non-inverted image of the first grating 10A on the second grating 10B. The primary function of such a relay optic 20 is to relay the two diffracted orders correctly, so that the required pre-cranking of the diffracted orders is maintained. One example of a suitable relay optic is an afocal telescope.

Illustrative Example

One illustrative example of the embodiment of FIG. 2 is as follows:

Wavelength, λ: 780 nm
Pre-crank angle, $\theta_{wfc}$: 0.75°
Grating period: 30 μm
Grating separation, D: 20 mm
Detector 22 period: 30 μm.

Figure 3:
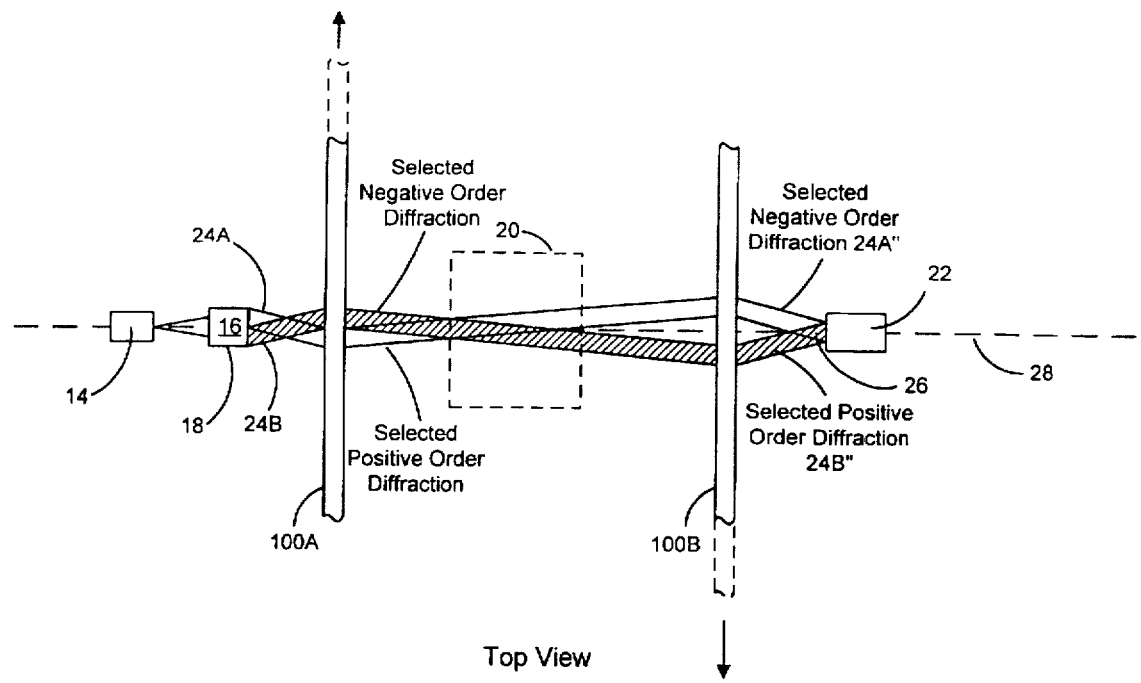
FIG. 3 is a simplified top view of a configuration of the present invention which can be used to measure linear displacement.

Linear Displacement Sensor:

Referring now to FIG. 3, a linear displacement sensor in accordance with the present invention is shown, which can be used to measure linear displacement between first and second objects, not shown. Elements common to the torque sensor and linear displacement embodiments bear the same reference designations. In the embodiment of FIG. 3, diffractive code disks or gratings 10A, 10B are replaced by linear gratings 100A, 100B. Linear grating 100A is attached a first object, not shown, while linear grating 100B is attached to a second object, not shown. Since linear gratings are used, the pre-compensation, or "twisting," function of the wave front correction element 18 of FIGS. 1 and 2 is not needed. Furthermore, depending upon the period of the detector 22 used and the period of gratings 10A, 100B, wave front correction element 18 may not be needed to adjust the period of the interference fringes in region 26 to accommodate the period of detector 22.

In accordance with the present invention, as was the case with the torque sensor embodiment, displacement of the first and second objects in directions parallel to each other, and generally transverse to axis 28, can be measured by measuring the phase change in the fringe pattern in region 26.

Figure 5:
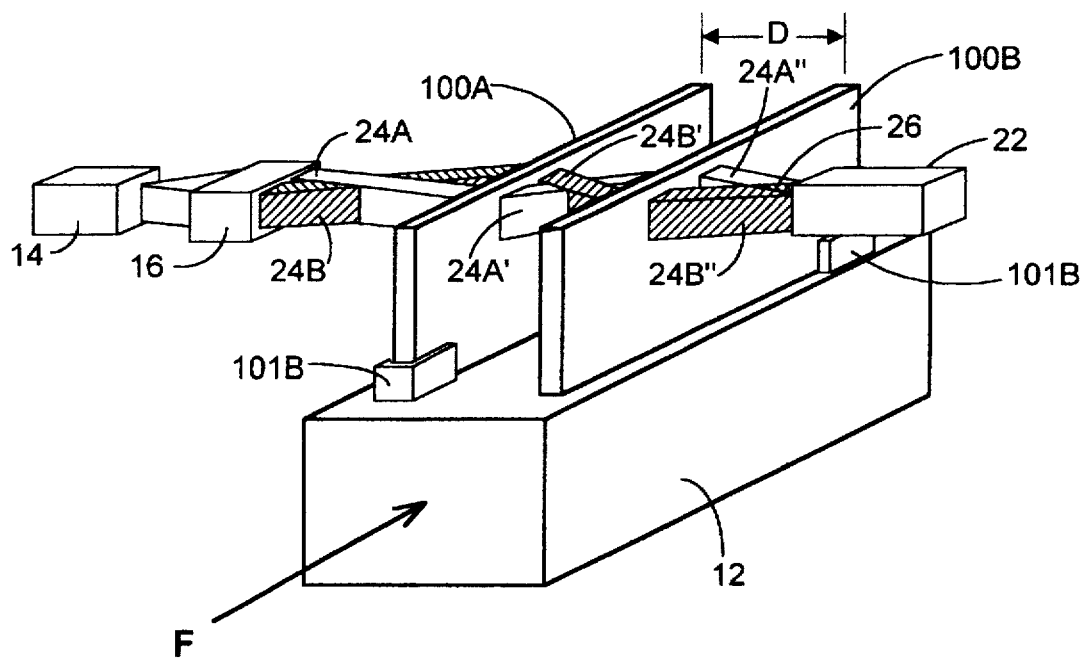
FIG. 5 is an example of a force sensor embodiment of the present invention.

The present invention can be embodied as a force sensor application by attaching the two gratings to the ends of a slightly compliant force transmitting shaft which is used to apply force to an object. An example of such an embodiment is provided in FIG. 5.

Gratings 100A and 100B are positioned parallel to one another along the longitudinal axis of force transmitting shaft 12 and separated by a distance D. Holders 101B support one end of each of gratings 100A and 100B. As can be seen from FIG. 5, grating 101A is supported by holder 101B at its end closest to the point where the force, F, is being applied. Conversely, grating 100B is supported at its end which is farthest from the point at which the force, F, is being applied. In this manner, gratings 100A and 100B are permitted to move relative to one another as force transmitting shaft 12 compresses or elongates. It is to be noted that, as is the case with the torque sensing embodiment, the force sensing provided by the present invention is independent of shaft displacement.

As force, F, is applied to the object 12, the force transmitting shaft 12 will compress which, in turn, will cause a change in the fringe pattern in region 26. By appropriate calibration of the force applied versus the change in fringe pattern, an indication can be obtained of the amount of force being applied to an object through the force tranmsitting shaft 12.

It is also to be understood that while the described embodiments are illustrated by way of transmissive gratings, reflective gratings can also be used within the spirit of the present invention. A benefit of using reflective gratings is that the present invention can be made more compact with the light source 14, the phased-array detector 22, and the relay optics, if any, located between the gratings.

In light of the above, it can be appreciated that the present invention permits the measurement of angular displacement using diffractive technology in a manner which is independent of the absolute rotation or the speed of rotation of the shaft in question. Moreover, the present invention the only contact with the objects of interest is with the diffraction grating, and such contact can be made without the need for joints which can weaken the objects of interest. Furthermore, because of the wave front correction techniques employed, the components used can be of nominal precision, thereby reducing the cost of such systems.

Figure 4:
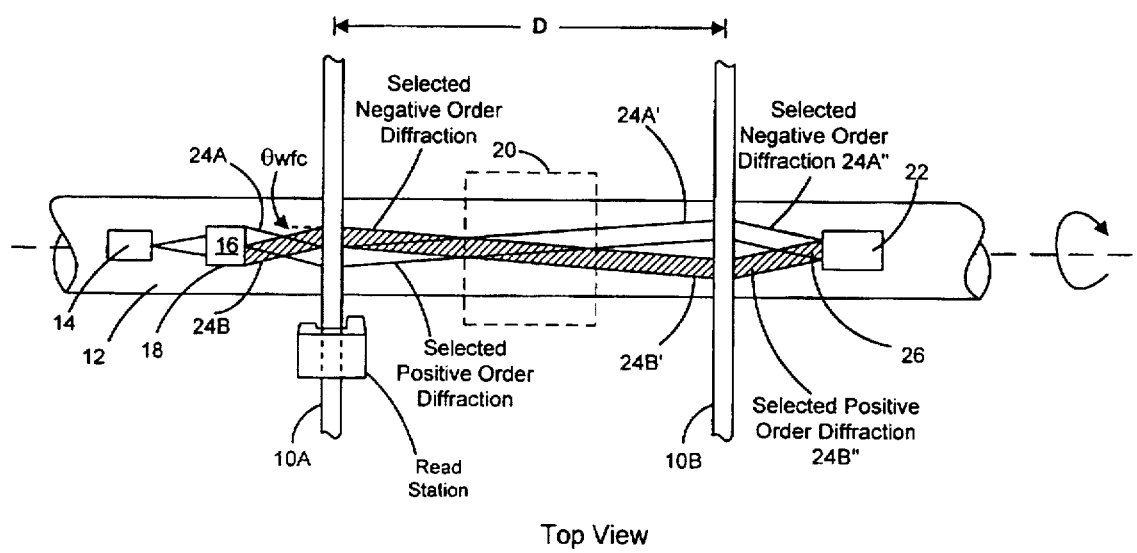
FIG. 4 is a simplified view of a further embodiment of the present invention which incorporates a read station to provide position and angular velocity information.

A further embodiment of the present invention is shown in FIG. 4 and provides position and angular velocity information in addition to torque for the rotary application or position and linear velocity for the linear application. The embodiment employs a read station, such as the read stations employed in Series No. 5T16 and 5T32 devices, available from MicroE, Inc. of Needham, Mass. Such a read station or head is described in U.S. Pat. No. 5,486,923 which has been incorporated by reference herein.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. An angular displacement sensing apparatus for use with an elongated member which is rotatable about a longitudinal axis of rotation, comprising:

a source of partially coherent light of wavelength $\lambda$ which provides a pair of beams at a predetermined angle between them;

a first diffraction producing device affixed to the elongated member for rotation therewith about a first point along the elongated member;

a second diffraction producing device, substantially identical to the first diffraction producing device, affixed to the elongated member for rotation therewith about a second point along the elongated member which is spaced away from the first point, wherein the source of coherent light and the first and second diffraction producing devices are positioned so that the first diffraction producing device diffracts the pair of beams, and the second diffracting producing device rediffracts the diffracted pair of beams; and a detector positioned in a region of natural interference between the rediffracted beams, whereby a change in relative position between the first and second diffraction producing devices appears as a change in a fringe pattern in the region of natural interference.

2. The apparatus of claim 1 further including a relay optic device positioned to relay the diffracted pair of beams to the second diffraction producing device.

3. The apparatus of claim 2 wherein the relay optic is non-inverting.

4. The apparatus of claim 1 wherein the first and second diffraction producing devices are substantially identical diffraction gratings.

5. The apparatus of claim 1 wherein the source of collimated light includes a light source providing light of wavelength $\lambda$;

a wave front compensator which splits the light from the light source into first and second beamlets, and which emits each beamlet at prescribed angles which are a function of the diffraction producing elements on the first and second diffraction producing devices.

6. A non-contacting torque sensor of the type which provides an indication of torque applied to an elongated member, comprising a first diffraction producing device having diffraction producing elements positioned along a predetermined radius thereof, and positioned for movement with the elongated member in a plane which is substantially orthogonal to a longitudinal axis of the elongated member;

a second diffraction producing device having diffraction producing elements positioned along a predetermined radius thereof, and positioned for movement with the elongated member in a plane which is substantially orthogonal to the longitudinal axis of the elongated member, wherein the second diffraction producing device is spaced away from the first diffraction producing device;

a source of collimated light of wavelength $\lambda$ which provides first and second beams propagating at a predetermined angle relative to one another, and in a direction generally parallel to the longitudinal axis of the elongated member, wherein the source of collimated light and the first and second interference producing devices are positionable relative to one another so that positive and negative diffraction beams are produced by the first diffraction producing device from each of the first and second beams, and so that a selected positive Nth order diffraction beam produced from one of the first and second beams and a selected negative Nth order diffraction beam produced from the other of the first and second beams propagate to the second diffraction producing device, which in turn produces positive and negative diffraction beams from each of the selected positive and negative Nth order diffraction beams; and a periodic detector having a sensing plane positioned within a region of natural interference between a positive diffraction beam of a selected order from one of the selected positive and negative Nth order diffraction beams and a negative diffraction beam of the same order from the other of the selected positive and negative Nth order diffraction beams, wherein the periodic detector provides a phase change which is indicative of the relative displacement of the first and second diffraction producing devices.

7. The apparatus of claim 6 further including a relay optic device positioned to relay the selected positive Nth order diffraction beam produced from one of the first and second beams and the selected negative Nth order diffraction beam produced from the other of the first and second beams to the second diffraction producing device.

8. The apparatus of claim 7 wherein the relay optic is non-inverting.

9. The apparatus of claim 6 wherein the source of collimated light includes a light source providing light of wavelength $\lambda$;

a wave front compensator which splits the light from the light source into first and second beamlets, and which emits each beamlet at prescribed angles which are a function of the diffraction producing elements on the first and second diffraction producing devices.

10. The apparatus of claim 6 wherein the first and second diffraction producing devices are substantially identical diffraction gratings.

11. A non-contacting torque sensor of the type which provides an indication of torque applied to a rotatable shaft, comprising a first diffraction grating positioned for rotation with the rotatable shaft in a first plane which is substantially orthogonal to a longitudinal axis of the rotatable shaft;

a second diffraction grating substantially identical to the first diffraction grating, and positioned for rotation with the rotatable shaft in a second plane which is substantially orthogonal to the longitudinal axis of the rotatable shaft and spaced away from and substantially parallel to the first plane;

a source of collimated light of wavelength $\lambda$;

a wave front correction device receiving the collimated light from the source of collimated light and which provides first and second beams propagating at a predetermined angle relative to one another, and in a direction generally parallel to the longitudinal axis of the elongated member, wherein the wave front correction device and the first and second diffraction gratings are positionable relative to one another so that positive and negative diffraction beams are produced by the first diffraction grating from each of the first and second beams, and so that a selected positive Nth order diffraction beam produced from one of the first and second beams and a selected negative Nth order diffraction beam produced from the other of the first and second beams propagate to the second diffraction grating, which in turn produces positive and negative diffraction beams from each of the selected positive and negative Nth order diffraction beams; and a periodic detector having a sensing plane positioned within a region of natural interference between a positive diffraction beam of a selected order from one of the selected positive and negative Nth order diffraction beams and a negative diffraction beam of the same order from the other of the selected positive and negative Nth order diffraction beams, wherein the periodic detector provides a phase change which is indicative of the relative displacement of the first and second diffraction gratings.

12. A non-contacting method for sensing torque applied to an elongated member which is rotatable along a longitudinal axis, comprising the steps of:

diffracting a pair of beams of light with a first diffraction producing device which is affixed to the elongated member for rotation therewith about a first point along the elongated member;

rediffracting the diffracted pair of beams of light with a second diffraction producing device, substantially identical to the first diffraction producing device, which is affixed to the elongated member for rotation therewith about a second point along the elongated member spaced away from the first point; and sensing interference between the rediffracted beams in a region of natural interference between them, whereby a change in relative position between the first and second diffraction producing devices appears as a change in a fringe pattern in the region of natural interference.

13. Apparatus for measuring relative displacement of first and second objects along substantially parallel paths, comprising first diffraction producing elements positioned on the first object, and positioned for movement with the first object in a plane which contains the path of the first object;

second diffraction producing elements positioned on the second object, and positioned for movement with the second object in a plane which contains the path of the second object;

a source of collimated light of wavelength $\lambda$ which provides first and second beams propagating at a predetermined angle relative to one another, and in a direction transverse to the plane of movement in which the first diffraction producing elements are contained, wherein the source of collimated light and the first and second interference producing elements are positionable relative to one another so that positive and negative diffraction beams are produced by the first diffraction producing elements from each of the first and second beams, and so that a selected positive Nth order diffraction beam produced from one of the first and second beams and a selected negative Nth order diffraction beam produced from the other of the first and second beams propagate to the second diffraction producing elements, which in turn produces positive and negative diffraction beams from each of the selected positive and negative Nth order diffraction beams; and a periodic detector having a sensing plane positioned within a region of natural interference between a positive diffraction beam of a selected order from one of the selected positive and negative Nth order diffraction beams and a negative diffraction beam of the same order from the other of the selected positive and negative Nth order diffraction beams, wherein the periodic detector provides a phase change which is indicative of the relative displacement of the first and second objects.

14. The apparatus of claim 13 further including a relay optic device positioned to relay the selected positive Nth order diffraction beam produced from one of the first and second beams and the selected negative Nth order diffraction beam produced from the other of the first and second beams to the second diffraction producing device.

15. The apparatus of claim 14 wherein the relay optic is non-inverting.

16. The apparatus of claim 13 wherein the first and second diffraction producing elements are contained in substantially identical diffraction gratings.

17. The apparatus of claim 13 further including a member of a selected compliance, wherein the first and second objects are positioned at spaced apart points on the member for movement with the spaced apart points.

18. Apparatus for measuring relative linear displacement of first and second objects, comprising a first diffraction producing device having a longitudinal axis along which diffraction producing elements are positioned, and positioned for movement with the first object and so that the longitudinal axis of the first diffraction producing device is positioned substantially parallel to the direction of displacement of the first object;

a second diffraction producing device having a longitudinal axis along which diffraction producing elements are positioned, and positioned for movement with the second object and so that the longitudinal axis of the second diffraction producing device is positioned substantially parallel to the direction of displacement of the second object;

a source of collimated light of wavelength $\lambda$ which provides first and second beams propagating at a predetermined angle relative to one another, and in a direction transverse to the directions of displacement of the first and second objects, wherein the source of collimated light and the first and second diffraction producing devices are positionable relative to one another so that positive and negative diffraction beams are produced by the first diffraction producing device from each of the first and second beams, and so that a selected positive Nth order diffraction beam produced from one of the first and second beams and a selected negative Nth order diffraction beam produced from the other of the first and second beams propagate to the second diffraction producing device, which in turn produces positive and negative diffraction beams from each of the selected positive and negative Nth order diffraction beams; and a periodic detector having a sensing plane positioned within a region of natural interference between a positive diffraction beam of a selected order from one of the selected positive and negative Nth order diffraction beams and a negative diffraction beam of the same order from the other of the selected positive and negative Nth order diffraction beams, wherein the periodic detector provides a phase change which is indicative of the relative motion of the first and second objects.

19. The apparatus of claim 18 further including a relay optic device positioned to relay the selected positive Nth order diffraction beam produced from one of the first and second beams and the selected negative Nth order diffraction beam produced from the other of the first and second beams to the second diffraction producing device.

20. The apparatus of claim 19 wherein the relay optic is non-inverting.

21. The apparatus of claim 18 wherein the first and second diffraction producing devices are substantially identical diffraction gratings.

22. The apparatus of claim 18 further including a member of a selected compliance, wherein the first and second objects are positioned at spaced apart points on the member for movement with the spaced apart points.

23. A apparatus for sensing force applied to an object, comprising:

an elongated member of a selected compliance through which force is applied to the object;

a source of partially coherent light of wavelength $\lambda$ which provides a pair of beams at a predetermined angle between them;

a first diffraction producing device affixed to the elongated member at a first point along the elongated member;

a second diffraction producing device, substantially identical to the first diffraction producing device, affixed to the elongated member at a second point along the elongated member which is spaced away from the first point, wherein the source of coherent light and the first and second diffraction producing devices are positioned so that the first diffraction producing device diffracts the pair of beams, and the second diffracting producing device rediffracts the diffracted pair of beams; and a detector positioned in a region of natural interference between the rediffracted beams, whereby a change in relative position between the first and second diffraction producing devices appears as a change in a fringe pattern in the region of natural interference.

24. A non-contacting method for sensing force applied to an elongated member of a selected compliance, comprising the steps of:

diffracting a pair of beams of light with a first diffraction producing device which is affixed to a first point on the elongated member for movement with the first point;

rediffracting the diffracted pair of beams of light with a second diffraction producing device, substantially identical to the first diffraction producing device, which is affixed to a second point of the elongated member for movement with the second point, wherein the second point is spaced away from the first point; and sensing interference between the rediffracted beams in a region of natural interference between them, whereby a change in relative position between the first and second diffraction producing devices appears as a change in a fringe pattern in the region of natural interference.

* * * * *